(12) United States Patent
Schmidt et al.

(10) Patent No.: US 11,487,217 B2
(45) Date of Patent: Nov. 1, 2022

(54) ADJUSTING A VELOCITY OF DEVELOPMENT UNITS

(71) Applicant: Hewlett-Packard Development Company, L.P., Spring, TX (US)

(72) Inventors: Wayne J. Schmidt, Boise, ID (US); MyungKook Ahn, Pangyo (KR); Wook Min, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,372

(22) PCT Filed: Sep. 4, 2018

(86) PCT No.: PCT/US2018/049374
§ 371 (c)(1),
(2) Date: Dec. 28, 2020

(87) PCT Pub. No.: WO2020/050819
PCT Pub. Date: Mar. 12, 2020

(65) Prior Publication Data
US 2021/0271435 A1    Sep. 2, 2021

(51) Int. Cl.
*G03G 15/06*   (2006.01)
*G03G 15/08*   (2006.01)
*G03G 15/00*   (2006.01)

(52) U.S. Cl.
CPC ....... *G03G 15/065* (2013.01); *G03G 15/0849* (2013.01); *G03G 15/0889* (2013.01); *G03G 15/0891* (2013.01); *G03G 15/5008* (2013.01)

(58) Field of Classification Search
CPC ............ G03G 15/065; G03G 15/0849; G03G 15/0889; G03G 15/0891; G03G 15/5008; G03G 15/50
See application file for complete search history.

(56) References Cited

U.S. PATENT DOCUMENTS

| | | |
|---|---|---|
| 5,530,527 A | 6/1996 | Fukasawa et al. |
| 6,785,481 B2 | 8/2004 | Bray et al. |
| 6,863,364 B2 | 3/2005 | Russell et al. |
| 7,224,917 B2 | 5/2007 | Julien et al. |
| 7,639,970 B2 | 12/2009 | Burry et al. |
| 7,676,167 B2 | 3/2010 | Yoshioka et al. |

(Continued)

FOREIGN PATENT DOCUMENTS

| | | |
|---|---|---|
| DE | 10358190 | 7/2005 |
| JP | 2004-101810 A | 4/2004 |

(Continued)

*Primary Examiner* — Sandra Brase
(74) *Attorney, Agent, or Firm* — Brooks Cameron & Huebsch PLLC

(57) ABSTRACT

Examples described herein relate to a system consistent with the disclosure. For instance, the system may comprise a printing device including hardware to adjust a velocity of a development unit within the printing device, a memory resource, and a controller in communication with the memory resource to determine an average usage condition of the printing device, wherein the average usage condition is based on at least one of a print coverage and a quantity of pages printed by the printing device, and adjust a velocity of the development unit based on the average usage condition.

14 Claims, 4 Drawing Sheets

(56) References Cited

U.S. PATENT DOCUMENTS

| | | |
|---|---|---|
| 8,200,107 B2 | 6/2012 | Maezawa |
| 2006/0024070 A1 | 2/2006 | Shim |
| 2006/0127133 A1* | 6/2006 | Suzuki ............... G03G 15/5008 |
| | | 399/236 |
| 2007/0122168 A1 | 5/2007 | Tanaka et al. |
| 2008/0310868 A1* | 12/2008 | Shin ................... G03G 15/5008 |
| | | 399/236 |
| 2009/0110414 A1 | 4/2009 | Itoyama et al. |
| 2009/0208232 A1* | 8/2009 | Maezawa ............... G03G 15/50 |
| | | 399/60 |
| 2009/0232524 A1 | 9/2009 | Takahashi et al. |
| 2011/0026948 A1* | 2/2011 | Nagasu ................ G03G 15/553 |
| | | 399/35 |
| 2016/0209774 A1* | 7/2016 | Abe .................... G03G 15/065 |

FOREIGN PATENT DOCUMENTS

| | | |
|---|---|---|
| JP | 2011-053633 A | 3/2011 |
| JP | 5148344 | 2/2013 |
| JP | 2016-099541 A | 5/2016 |

* cited by examiner

ADJUSTING A VELOCITY OF DEVELOPMENT UNITS

BACKGROUND

Imaging systems, such as printing devices, printers, copiers, etc., may be used to form markings on a print medium, text, images, etc. In some examples, imaging systems may form markings on the print medium by performing a print job. A print job can include forming markings such as text and/or images by transferring a print substance (e.g., ink, toner, etc.) from a cartridge to the print medium.

SUMMARY OF THE INVENTION

Examples may include a printing device including hardware to adjust a velocity of a development unit within the printing device, a memory resource, and a controller in communication with the memory resource to determine an average usage condition of the printing device, wherein the average usage condition is based on at least one of a print coverage and a quantity of pages printed by the printing device, and adjust a velocity of the development unit based on the average usage condition.

DETAILED DESCRIPTION

Figure 1:
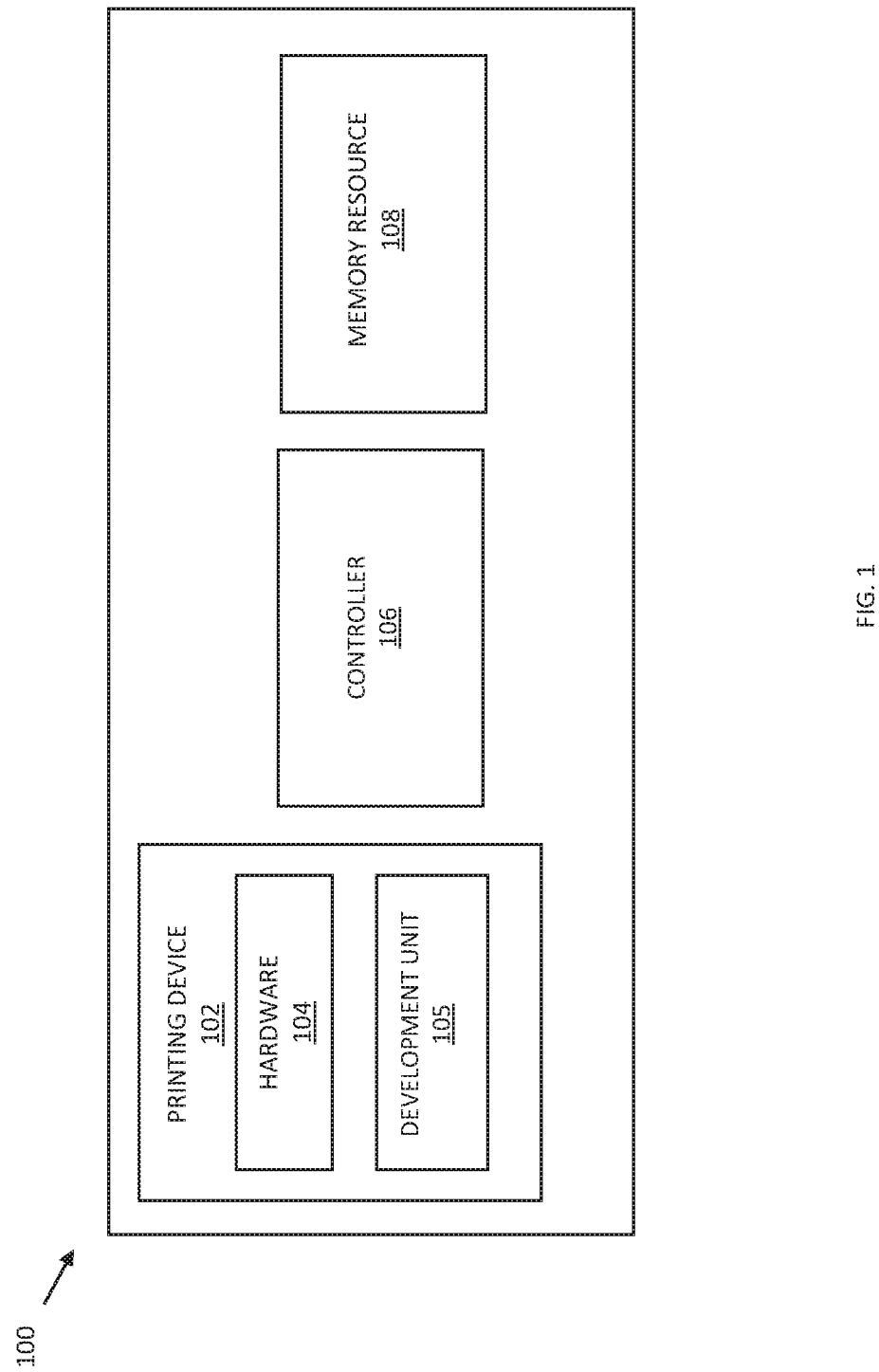
FIG. 1 illustrates an example of a system consistent with the disclosure.

Printing devices may form markings on a physical print medium (e.g., paper, photopolymers, plastics, composite, metal, wood, etc.) by transferring a print substance (e.g., ink, toner, etc.) to the print medium. As used herein, the term "printing device" refers to a hardware device with functionalities to physically produce representation(s) of text, images, models, etc. on a physical print medium. Examples of imaging devices may include imaging devices such as ink/toner printers and/or three-dimensional printers, among other types of imaging devices.

Printing devices may store print substance within a cartridge to deposit the print substance onto print medium during the output of a print job. As used herein "print medium" refers to an individual paper, photopolymer, plastic, composite, metal, wood, or other material on which markings may be formed to make up a physical representation of the output of a print job or a portion of an output of a print job. As used herein, the term "print job" refers to signals or states, which may be stored in a file and/or a set of files, usable to instruct a printing device in forming markings such as text, images, etc, on print media and/or objects such as three-dimensional object.

The printing device may be an electrophotographic printer. An electrophotographic printer is configured to print markings on print medium using electrostatic charges, print substance (e.g., toner), and light. In some examples, in the electrophotography process, print substance is transferred to the print medium through development of an image onto an exposed portion of a photosensitive substrate. This process is referred to as development. During the process of development, new print substance is supplied to an organic photo conductor (OPC) drum by a set of delivery augers and rotating rollers. These augers and rollers may impart triboelectric charges to the print substance through physical agitation of print substance particles. In some systems, the turbo-charged print substance may adhere to magnetic particles which provide the print substance to the OPC. The print substance may then be transferred to the exposed portions of the OPC.

This process of physically agitating the print substance to generate triboelectric charge can have a damaging effect to the print substance particles if it occurs for an extended period of time. Additionally, there can be an initial overcharging of the print substance that can result in decreased image density. For example, if a small quantity of print substance is consumed (e.g., such as low-coverage printing) then the agitated print substance particles can lose their charge carry capacity, lose additives which enhance charging performance, or become "stressed" such that the print substance particles are no longer effective for development. In such cases, the print substance may need to be discharged or wasted to prevent problems such as print substance escaping (e.g., toner dusting) or print quality defects. Draining (e.g., disposing of) print substance can be inefficient as the print substance becomes waste.

Some approaches may drain the waste (e.g., print substance particles which have lost their charge capacity) to keep the printing device operating. In such an approach, there may be a print substance yield loss as well as filling a waste toner box (WTB) at an increased rate, thus also reducing its yield. Factors such as these may result in an increased cost-per-page printed.

In contrast, this disclosure is directed to determining an average usage condition based on a print coverage and/or a quantity of pages printed by the printing device, and based on the determined average usage condition, altering the velocity of the development unit. Said differently, this disclosure is directed to determining an average usage condition and based on the determined average usage condition, accelerating or decelerating the velocity of the development unit. As used herein, the term "average usage condition" refers to a value based on the average print coverage, the average pages printed per day, and/or the average pages printed per print job by the printing device. For example, average usage condition may be different based on the aforementioned factors and/or within a particular cartridge as it is utilized for multiple print job outputs.

In another example described herein, the printing device may include a stored predetermined range of average usage condition values, where the range of average usage condition values correspond to a velocity of a development unit within the printing device. Said differently, the determined average usage condition may be compared to the stored average usage condition values, and the comparison may include instructions of whether to adjust the velocity of the development unit based on the comparison. Thus, based on the average usage condition, a printing device may be programmed to decrease, increase, and/or refrain from altering the velocity of the development unit, thereby preserving resources, saving time, and saving money as compared to other approaches, FIG. 1 illustrates an example of a system 100 consistent with the disclosure. The system 100 may be implemented in a variety of imaging systems, such as printers, copiers, etc., for example. In some examples, the system 100 may include a printing device 102 including hardware 104 to adjust a velocity of a development unit. As used herein, the term "velocity of the development unit" refers to the speed of a development roller within the development unit relative to the speed of an OPC at an area where the OPC and the development roller are in contact to deliver the print substance to the print material. The printing device 102 may utilize the hardware 104 to deliver print substance on print medium to form markings and/or physical representations on the print medium. The hardware, for example can include a processor and/or a memory resource (e.g., MRM, computer-readable medium (CRM), data store, etc.).

The printing device 102 may be an electrophotographic printer. An electrophotographic printer is configured to print markings on print medium using electrostatic charges, print substance (e.g., toner), and light. An electrophotographic printer may include a development unit 105 to transfer print substance to an OPC. The development unit 105 development unit 105 may include a development roller, a development supply auger, and a development mixing auger, which are configured to transfer the print substance to the OPC. Additionally, while not illustrated in FIG. 1, the printing device 102 may include a waste outlet to dispose of a quantity of print substance that is not transferred to the print medium. As previously described, agitated print substance can lose their charge carry capacity, lose additives which enhance charging performance, or become "stressed" such that the print substance particles are no longer effective for development. In such cases, the print substance may need to be discharged using the waste outlet to prevent problems such as print substance escaping (e.g., toner dusting) or print quality defects. The agitation to the print substance can be reduced by adjusting the velocity of the development unit 105, and by reducing the agitation to the print substance, the quantity of print substance waste may decrease. This can preserve print substance, saving time and money.

In some examples, the system 100 may include a memory resource 108 to store information. The memory resource 108 may store a predetermined range of average usage condition values table for the system 100. In some examples, the predetermined range of average usage condition values table stored in the memory resource 108 may assist the printing device 102 in adjusting the velocity of the development unit 105. As described herein, adjusting the velocity of the development unit 105 may include adjusting the velocity of the development roller relative to the velocity of the OPC. In some examples, adjusting the velocity of the development unit 105 may result in a different level of print substance being disposed of via the waste outlet. Each velocity of the development unit 105 may have a threshold average usage condition value. Additionally, each predetermined range of average usage condition values may correspond to a value corresponding to a velocity of the development unit 105, where operating at the corresponding velocity may result in an acceptable quantity of print substance being disposed via the waste outlet.

In some examples, the system 100 may include a controller 106 in communication with the memory resource 108 via a communication link. Although not illustrated in FIG. 1 for clarity, the controller 106 may include a processor which may include a number of processing resources capable of executing instructions stored by the memory resource 108. The controller 106 may provide instructions to adjust a velocity of a development unit 105 within the printing device 102 based on an average usage condition as determined by the controller 106. Said differently, the controller 106 may determine an average usage condition of the printing device 102, and based on the average usage condition, the controller 106 may adjust the velocity of the development unit 105. The average usage condition may be based on a print coverage and/or a quantity of pages printed by the printing device 102. For example, the controller 106 may determine that a printing device 102 has a particular average usage condition based on the print coverage and/or the quantity of pages printed by the printing device 102. The controller 106 may compare the determined average usage condition of the printing device 102 to a predetermined range of average usage condition values that may be stored in the memory resource 108 of the printing device 102. Each value of the predetermined range of average usage conditions may include actions to guide the amount of velocity adjustments that should be applied to a development unit 105 within the printing device 100.

As used herein, the term "predetermined range of average usage conditions" refers to a value that may be an actual measurement and/or be derived from a print coverage value and/or a quantity of pages printed value determined by the controller 106. In some examples, the predetermined range of average usage condition values may be determined in response to detecting average usage condition values that correspond to a development unit velocity that result in a particular amount of print substance waste. In some examples, an average usage condition value may correspond to a predetermined range of average usage condition values indicating that the development unit 105 is operating at a particular velocity, and the particular velocity of the development unit 105 would result in an unacceptable amount of print substance waste. In other examples, an average usage condition value may correspond to a predetermined range of average usage condition values indicating that the development unit 105 is operating at a particular velocity, and the particular velocity of the development unit would result in an acceptable amount of print substance waste. In some examples, the predetermined range of average usage condition values may be arbitrary numbers assigned to particular average usage condition values and determined by the controller 106.

For example, the controller 106 may determine that the printing device 102 is operating at a particular average usage condition value. The controller 106 may compare the particular average usage condition value to the predetermined range of average usage condition values and see that the particular average usage condition value corresponds to a velocity of 1.3×, which may result in a drain level of 1. In such an example, a value of 1.3× means that the development roller within the development unit 105 is 1.3 times faster than the OPC's rotations per minute (rpm). Thus, if the OPC speed is 330 mm/sec and the velocity of the development unit is 1.3×, then the velocity of the development roller is 429 mm/sec. A drain level may correspond to a particular percentage of drain coverage. In this particular example, a drain value of 1 may correspond to a 1 percent drain coverage. As used herein, the term "drain coverage" refers to if the reference coverage to be consumed. For example, 1 percent drain coverage may indicate that draining (e.g., disposing) of print material will be performed when the print coverage is less than 1 percent coverage. The value corresponding to the percentage of drain coverage may be any arbitrary predetermined value assigned to the percentage of drain coverage.

The controller 106 may compare the velocity at which the development unit 105 is operating with the determined velocity corresponding to the average usage condition value.

Based on the comparison, the controller 106 may determine whether to adjust the velocity of the development unit 105. Said differently, the controller 106 may refrain from adjusting the velocity of the development unit 105 in response to the determination that the velocity that the development unit is currently operating is the velocity to which the average usage condition corresponds.

In another example, based on the comparison, the controller 106 may adjust (e.g., accelerate or decelerate) the velocity of the development unit 105 in response to the determination that the velocity that the development unit 105 is currently operating at is less than or greater than the velocity that the average usage condition corresponds to. Said differently, the controller 106 may accelerate the velocity of the development unit 105 in response to the determination that the velocity that the development unit 105 is currently operating at is less than the velocity that the average usage condition corresponds to or the controller 106 may decelerate the velocity of the development unit 105 in response to the determination that the velocity that the development unit 105 is currently operating at is greater than the velocity to which the average usage condition corresponds.

Although controller 106 is illustrated in FIG. 1 as being included in system 100, examples of the disclosure are not so limited. For example, controller 106 may be remote from system 100 and/or printing device 102 and may communicate with system 100 and/or printing device 102 via a network relationship, such as a wired or wireless network.

Figure 2:
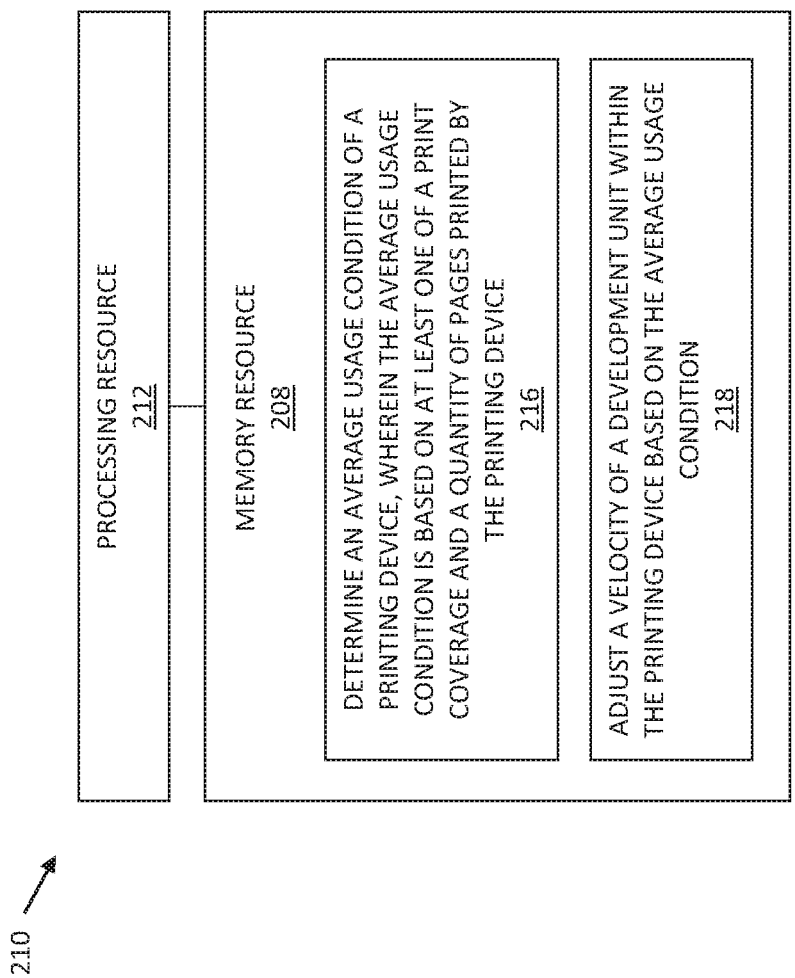
FIG. 2 illustrates an example of an apparatus suitable with a system consistent with the disclosure.

FIG. 2 illustrates an example of an apparatus 210 suitable with a system (e.g., system 100) consistent with the disclosure. As illustrated in FIG. 2, the apparatus 210 includes a processing resource 212 and a memory resource 208. The processing resource 212 may be a hardware processing unit such as a microprocessor, application specific instruction set processor, coprocessor, network processor, or similar hardware circuitry that may cause machine-readable instructions to be executed. In some examples, the processing resource 212 may be a plurality of hardware processing units that may cause machine-readable instructions to be executed. The processing resource 212 may include central processing units (CPUs) among other types of processing units. The memory resource 208 may be any type of volatile or non-volatile memory or storage, such as random-access memory (RAM), flash memory, read-only memory (ROM), storage volumes, a hard disk, or a combination thereof.

The memory resource 208 may store instructions thereon, such as instructions 216 and 218. When executed by the processing resource 212, the instructions may cause the apparatus 210 to perform specific tasks and/or functions. For example, the memory resource 208 may store instructions 216 which may be executed by the processing resource 212 to cause the apparatus 210 to determine an average usage condition of a printing device, wherein the average usage condition is based on at least one of a print coverage and a quantity of pages printed by the printing device.

A controller such as controller 106 described with respect to FIG. 1 may monitor and store data related to the print coverage of the printing device over a period of time. Based on the data stored over the period of time, the controller may determine a value that represents an average print coverage. The value representing the average print coverage may be a factor utilized by the controller to determine the velocity of the development unit.

Additionally, the controller may monitor and store data related to the quantity of pages the printing device is printing over a period of time. For example, the controller may monitor and store data relating to the number of pages the printing device is printing per day and/or the number of pages the printing device is printing per print job over the period of time.

Based on the data relating to the number of pages the printing device is printing per day and/or the number of pages the printing device is printing per print job over the period of time, the controller may determine a value that represents an average pages printed per day by the printing device and/or a value representing an average pages printed per print job by the printing device. The value that represents the average pages printed per day and/or the value representing the average pages printed per print job may be factors utilized by the controller to determine the velocity of the development unit.

The controller may determine the average usage condition of the printing device based on the value representing the average print coverage, the value that represents the average pages printed per day, and/or the value representing the average pages printed per print job. For example, the average usage condition can be represented by a value that is based on the value representing the average print coverage, the value that represents the average pages printed per day, and/or the value representing the average pages printed per print job. The value representing the average print coverage may be used by the controller to determine the velocity of the development unit.

The memory resource 208 may store instructions 218 which may be executed by the processing resource 212 to cause the apparatus 210 to adjust a velocity of a development unit within the printing device based on the average usage condition. Adjusting the velocity of the development unit may result in a change in the amount of print substance that is disposed of, which may reduce the consumption of print substance by the printing device, as well as reduce the amount of print substance that is wasted by the printing device.

In some examples, the controller may adjust the velocity of a development unit within the printing device based on the average usage condition as determined by a controller. For example, the controller may determine that a printing device has a particular average usage condition based on the average print coverage, the average quantity of pages printed per day, and/or the average quantity of pages printed per print job. The controller may compare the determined average usage condition of the printing device to a predetermined range of average usage condition values that may be stored in the memory resource 108. Each value of the predetermined range of average usage conditions may include actions to guide the amount of velocity adjustments that should be applied to the development unit.

In some examples, the predetermined range of average usage condition values may be determined in response to detecting average usage condition values that correspond to a development unit velocity that result in a particular amount of print substance waste. In some examples, an average usage condition value may correspond to a predetermined range of average usage condition values indicating that the development unit is operating at a particular velocity, and the particular velocity of the development unit would result in an unacceptable amount of print substance waste. In other examples, an average usage condition value may correspond to a predetermined range of average usage condition values indicating that the development unit is operating at a particular velocity, and the particular velocity of the development unit would result in an acceptable amount of print substance waste.

For example, the controller may determine that the printing device is operating at a particular average usage condition value. The controller may compare the particular average usage condition value to the predetermined range of average usage condition values and see that the particular average usage condition value corresponds to a velocity of 1.5×, which may result in a drain level of 0. In such an example, a value of 1.5× means that the development roller within the development unit is 1.5 times faster than the OPC's rotations per minute (rpm). A drain level may correspond to a particular percentage of drain coverage. In this particular example, a drain value of 1 may correspond to a 0 percent drain coverage (e.g., no drain function).

The controller may compare the velocity at which the development unit is operating with the determined velocity corresponding to the average usage condition value. Based on the comparison, the controller may determine whether to adjust the velocity of the development unit. In another example, based on the comparison, the controller may adjust (e.g., accelerate or decelerate) the velocity of the development unit in response to the determination that the velocity that the development unit is currently operating at is less than or greater than the velocity that the average usage condition corresponds to.

Said differently, the controller may accelerate the velocity of the development unit in response to the determination that the velocity at which the development unit is currently operating is less than the velocity to which the average usage condition corresponds, or the controller may decelerate the velocity of the development unit in response to the determination that the velocity at which the development unit is currently operating is greater than the velocity to which the average usage condition corresponds. For example, if the controller detects that the development unit is currently operating at a velocity of 1.7×, and the average usage condition corresponds to a velocity of 1.3×, the controller may adjust (e.g., decelerate) the velocity of the development to 1.3×.

Adjusting the velocity of the development may include adjusting a parameter of the printing device. For example, based on the determined velocity of the development unit, the controller may adjust a parameter, such as the toner concentration, development high voltage, and/or exposure power of the printing device, among other parameters that may be adjusted in response to adjusting the velocity of the development unit. In some examples, at least one parameter may be adjusted. As used herein, the term "toner concentration" refers to the print substance concentration of development powder within the development unit. As used herein, the term "development high voltage" refers to a quantity of voltage supplied to the development roller to move the print substance to the OPC. As used herein, the term "exposure power" refers to an intensity of a laser generated by a laser scanning unit within the printing device. Increasing the exposure power, the development high voltage, and/or the velocity of the development may result in increased image density.

Figure 3:
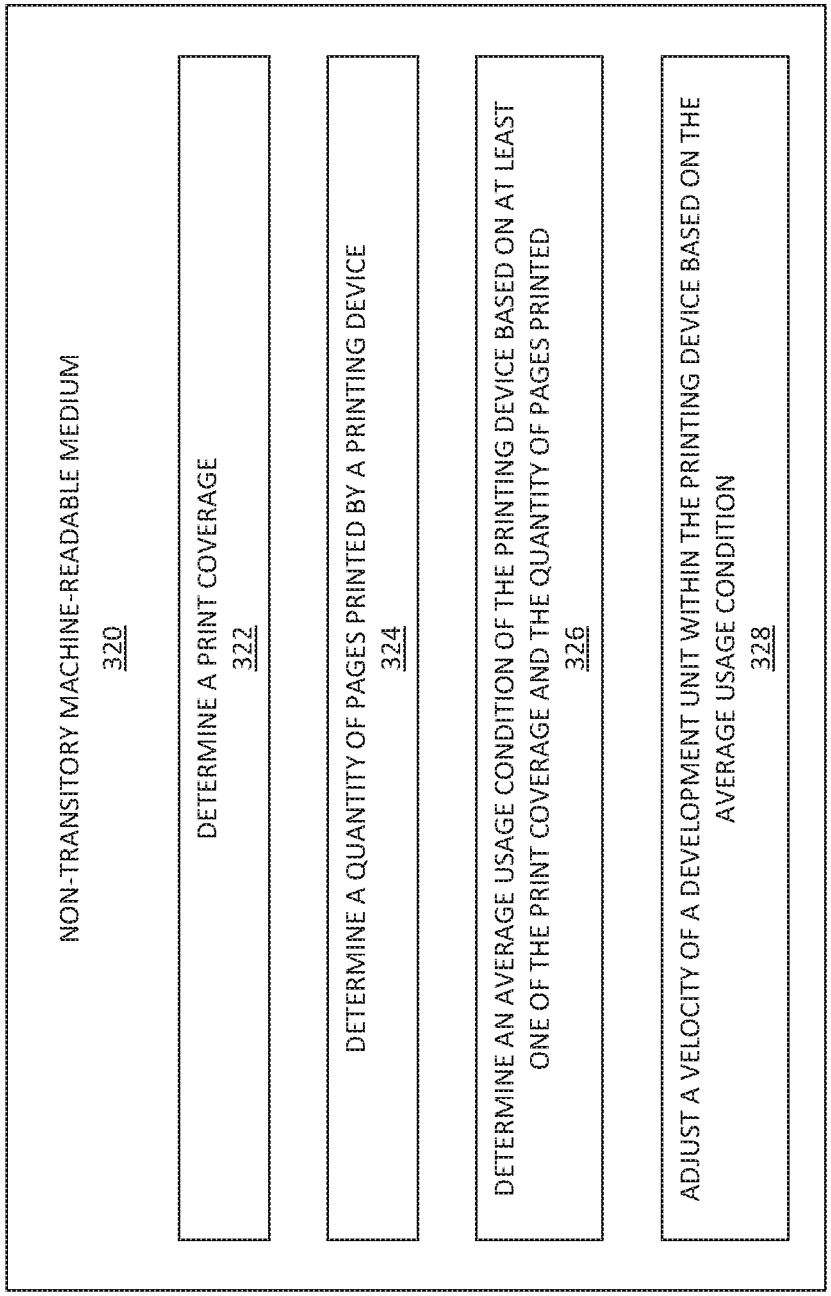
FIG. 3 illustrates an example diagram of a non-transitory machine readable medium suitable with a system consistent with the disclosure.

FIG. 3 illustrates an example diagram of a non-transitory machine readable medium 320 suitable with a system (e.g., system 100) consistent with the disclosure. The non-transitory machine-readable medium 320 may be any type of volatile or non-volatile memory or storage, such as RAM, flash memory, ROM, storage volumes, a hard disk, or a combination thereof.

The medium 320 stores instructions 322 executable by a processing resource such as processing resource 212 described with respect to FIG. 2 to receive a determine a print coverage by a printing device. A controller such as controller 106 described with respect to FIG. 1 may monitor the print coverage by the printing device over a period of time. Based on the print coverage over the period of time, the controller may determine an average print coverage by the printing device.

The medium 320 stores instructions 324 executable by the processing resource to determine a quantity of pages printed by the printing device. The controller may determine the quantity of pages printed by the printing device based on a quantity of pages printed by the printing device per day and/or a quantity of pages printed by the printing device per print job. The controller may store the determined quantity of pages printed per day and/or the determined quantity of pages printed per print job over a period of time.

Based on the determination by the controller of the quantity of pages printed per day over the period of time, the controller may determine an average number of pages printed per day. Additionally, based on the determination by the controller of the quantity of pages printed per print job over the period of time, the controller may determine an average quantity of pages printed per print job. As described herein, the velocity of the development unit may be adjusted based on the average print coverage, the average quantity of pages printed per day and/or the average quantity of pages printed per print job to reduce the amount of print substance that is wasted by the printing device.

The medium 320 stores instructions 326 executable by the processing resource to determine an average usage condition of the printing device based on at least one of the print coverage and the quantity of pages printed. The average usage condition may be a value based on the average coverage, the average pages printed per day, and/or the average pages printed per print job.

In some examples, an average usage condition value may correspond to a predetermined range of average usage condition values indicating that the development unit is operating at a particular velocity, and the particular velocity of the development unit would result in an unacceptable amount of print substance waste. In other examples, an average usage condition value may correspond to a predetermined range of average usage condition values indicating that the development unit is operating at a particular velocity, and the particular velocity of the development unit would result in an acceptable amount of print substance waste.

The medium 320 stores instructions 328 executable by the processing resource to adjust a velocity of the development unit based on the average usage condition. The determination of the velocity of the development unit may be made prior to the start of a new print job. The controller may determine whether to increase, decrease, or make no change to the velocity of the development unit prior to the start of the new print job based on the average usage.

The controller may compare the velocity at which the development unit is operating with the determined velocity corresponding to the average usage condition value. Based on the comparison, the controller may determine whether to adjust the velocity of the development unit. Said differently, the controller 106 may refrain from adjusting the velocity of the development unit in response to the determination that the velocity that the development unit is currently operating is the velocity that the average usage condition corresponds to.

In another example, based on the comparison, the controller may adjust (e.g., accelerate or decelerate) the velocity of the development unit in response to the determination that the velocity that the development unit is currently operating at is less than or greater than the velocity that the average usage condition corresponds to. Said differently, the controller may accelerate the velocity of the development unit in response to the determination that the velocity that the development unit is currently operating at is less than the velocity that the average usage condition corresponds to or the controller may decelerate the velocity of the development unit in response to the determination that the velocity that the development unit is currently operating at is greater than the velocity that the average usage condition corresponds to.

Figure 4:
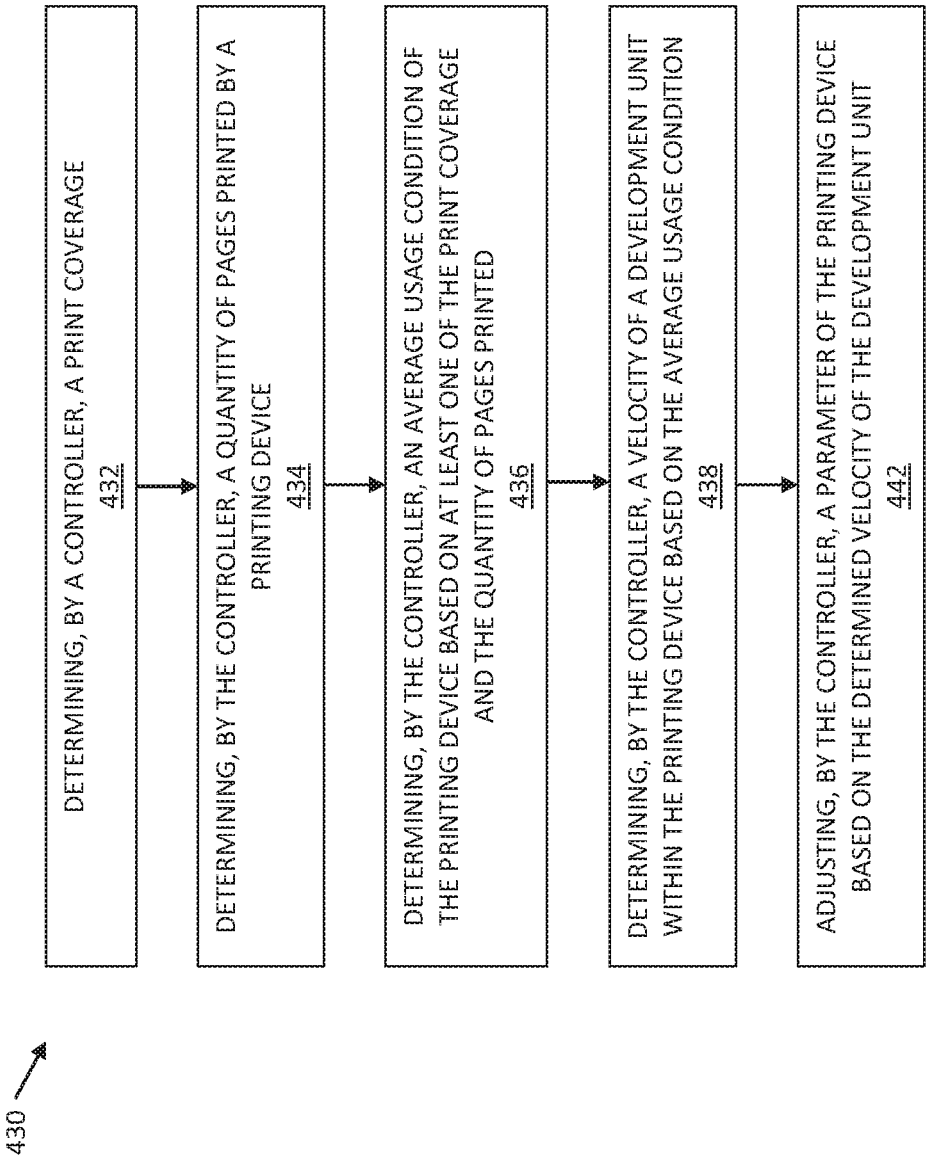
FIG. 4 illustrates an example of a method consistent with the disclosure.

FIG. 4 illustrates an example of a method 430 consistent with the disclosure. Method 430 may be performed, for example, by a controller (e.g., controller 106 described in FIG. 1) of a system (e.g., system 100 described in FIG. 1)

At 432, the method 430 may include determining, by a controller, a print coverage by a printing device. The controller may monitor the print coverage by the printing device over a period of time. Based on the print coverage over the period of time, the controller may determine an average print coverage by the printing device.

At 434, the method 430 may include determining, by the controller, a quantity of pages printed by the printing device. The controller may determine the quantity of pages printed by the printing device based on a quantity of pages printed by the printing device per day and/or a quantity of pages printed by the printing device per print job. The controller may store the determined quantity of pages printed per day and/or the determined quantity of pages printed per print job over a period of time.

Based on the determination by the controller of the quantity of pages printed per day over the period of time, the controller may determine an average number of pages printed per day. Additionally, based on the determination by the controller of the quantity of pages printed per print job over the period of time, the controller may determine an average quantity of pages printed per print job.

At 436, the method 430 may include determining, by the controller, an average usage condition of the printing device based on at least one of the print coverage and the quantity of pages printed. The average usage condition may be a value based on the average coverage, the average pages printed per day, and/or the average pages printed per print job.

At 438, the method 430 may include determining, by the controller, a velocity of a development unit based on the average usage condition. The determination of the velocity of the development unit may be made prior to the start of a new print job. The controller may determine whether to increase, decrease, or do not change the velocity of the development unit prior to the start of the new print job based on the average usage condition.

For example, the controller may adjust (e.g., accelerate or decelerate) the velocity of the development unit in response to the determination that the velocity at which the development unit is currently operating is less than or greater than the velocity to which the average usage condition corresponds. Said differently, the controller 106 may accelerate the velocity of the development unit in response to the determination that the velocity at which the development unit is currently operating is less than the velocity to which the average usage condition corresponds, or the controller may decelerate the velocity of the development unit in response to the determination that the velocity at which the development unit is currently operating is greater than the velocity to which the average usage condition corresponds.

At 442, the method 430 may include adjusting, by the controller, a number parameter of the printing device based on the determined velocity of the development unit. Based on a determination to adjust the velocity of the development unit, the controller may adjust a number of parameters, such as the toner concentration, development high voltage, and/or exposure power of the printing device. Adjusting the number of parameters of the printing device may adjust an image density. For example, increasing the exposure power, the development high voltage, and/or the velocity of the development may result in increased image density.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. Further, as used herein, "a plurality of" an element and/or feature refers to more than one of such elements and/or features.

The above specification, examples and data provide a description of the method and applications and use of the system and method of the present disclosure. Since many examples can be made without departing from the spirit and scope of the system and method of the present disclosure, this specification merely sets forth some of the many possible example configurations and implementations.

What is claimed:

1. A system, comprising:
 a printing device including hardware to adjust a velocity of a development unit within the printing device;
 a memory resource; and
 a controller in communication with the memory resource to:
  determine an average usage condition of the printing device, wherein the average usage condition is based on at least one of a print coverage and a quantity of pages printed by the printing device; and
  adjust a velocity of the development unit by adjusting at least one parameter based on the average usage condition,
   wherein parameters include toner concentration, development high voltage, and exposure power.

2. The system of claim 1, wherein the controller is to:
 determine print coverage;
 determine an average quantity of pages printed over a predetermined interval of time; and
 determine an average quantity of pages printed in a print job.

3. The system of claim 1, wherein the printing device includes a waste outlet to dispose of a quantity of print substance that is not transferred to a print medium.

4. The system of claim 1, wherein the printing device is an electrophotographic printer.

5. The system of claim 1, wherein the development unit includes:
- a development roller;
- a development supply auger; and
- a development mixing auger.

6. A non-transitory machine-readable medium storing instructions that, when executed by a processing resource, cause the processing resource to:
- determine a print coverage by a printing device;
- determine a quantity of pages printed by the printing device;
- determine an average usage condition of the printing device based on at least one of the print coverage and the quantity of pages printed;
- determine a velocity of a development unit within the printing device based on the average usage condition; and
- adjust the velocity of the development unit within the printing device by adjusting a parameter of the printing device based on the determined velocity of the development unit.

7. The medium of claim 6, wherein the instructions to adjust the velocity of the development unit further include instructions to:
- increase the velocity of the development unit, wherein increasing the velocity of the development unit increases print material consumption and increases print material waste.

8. The medium of claim 6, wherein the instructions to adjust the velocity of the development unit further include instructions to:
- decrease the velocity of the development unit, wherein decreasing the velocity of the development unit reduces print material consumption and print material waste.

9. The medium of claim 6, wherein adjusting the velocity of the development unit includes adjusting the velocity of a development roller relative to a velocity of an organic photo conductor (OPC) within the printing device.

10. The medium of claim 9, wherein a drain level decreases as the velocity of the development unit decreases.

11. A method, comprising:
- determining, by a controller, a print coverage by a printing device;
- determining, by the controller, a quantity of pages printed by the printing device;
- determining, by the controller, an average usage condition of the printing device based on at least one of the print coverage and the quantity of pages printed;
- determining, by the controller, a velocity of a development unit within the printing device based on the average usage condition; and
- adjusting, by the controller, a parameter of the printing device based on the determined velocity of the development unit.

12. The method of claim 11, wherein adjusting the parameter of the printing device occurs prior to initiating a print job.

13. The method of claim 11, further comprising adjusting the velocity of the development unit to a velocity that is determined by the average usage condition of the printing device.

14. The method of claim 11, wherein adjusting the parameter of the printing device adjusts an image density.

\* \* \* \* \*